United States Patent [19]

Lo

[11] Patent Number: 4,614,768

[45] Date of Patent: Sep. 30, 1986

[54] PROCESS FOR PREPARATION OF COPOLYMERS OF ISOPROPENYL AROMATIC MONOMER AND VINYL AROMATIC MONOMER

[75] Inventor: Grace Y. Lo, Midland, Mich.

[73] Assignee: The Dow Chemical Company, Midland, Mich.

[21] Appl. No.: 734,988

[22] Filed: May 17, 1985

Related U.S. Application Data

[63] Continuation-in-part of Ser. No. 630,906, Jul. 13, 1984, abandoned, which is a continuation-in-part of Ser. No. 525,336, Aug. 22, 1983, abandoned.

[51] Int. Cl.$^4$ .................................................. C08F 2/06
[52] U.S. Cl. .................................... 525/250; 525/242; 525/271; 525/313; 525/314

[58] Field of Search ............... 525/271, 250, 242, 313, 525/314

[56] References Cited

U.S. PATENT DOCUMENTS

| | | | |
|---|---|---|---|
| 4,427,837 | 1/1984 | Tung et al. | 525/314 |
| 4,431,777 | 2/1984 | Tung et al. | 525/314 |
| 4,525,560 | 6/1985 | Smith | 526/201 |

FOREIGN PATENT DOCUMENTS 0014947 9/1980 European Pat. Off. ............ 525/271

*Primary Examiner*—Wilbert J. Briggs, Sr.
*Attorney, Agent, or Firm*—D. N. Deline

[57] ABSTRACT

Blends of polymers of diene and styrene-α-methylstyrene type monomers are prepared by solution polymerization employing intermittent addition of monomers and initiators to provide a desired composition.

15 Claims, No Drawings

PROCESS FOR PREPARATION OF COPOLYMERS OF ISOPROPENYL AROMATIC MONOMER AND VINYL AROMATIC MONOMER

This application is a continuation-in-part of the copending application Ser. No. 630,906 filed July 13, 1984, which is a continuation-in-part of Ser. No. 525,336, filed Aug. 22, 1983, both now abandoned.

Block polymers of α-methylstyrene and butadiene of the ABA configuration wherein A represents a block of α-methylstyrene and B represents a butadiene block are known and disclosed in British Pat. No. 1,444,680, and are also described in the *Journal of Applied Polymer Science,* Volume 22, 2907–2913 (1978). α-Methylstyrene has a relatively low ceiling temperature of about 61° centigrade. The ceiling temperature is that temperature at which the rate of depolymerization equals the rate of polymerization. Generally α-methylstyrene polymerization proceeds slowly and because of the low ceiling temperature must be carried out at relatively low temperatures. Copolymers of styrene and α-methylstyrene are very difficult to prepare in an economic fashion. The desirability of employing a copolymer of styrene and α-methylstyrene as a block has been set forth in U.S. Pat. Nos. 4,431,777 and 4,427,837. Substantial and significant difficulty is encountered in the preparation of such copolymers and block copolymers on a commercial scale because of the relatively high proportion of solvent which must be employed. The reactivity ratio between styrene and α-methylstyrene is such that in order to obtain the one-to-one copolymer, an economically unreasonable quantity of α-methylstyrene must be employed. Therefore in an anionic polymerization relatively large volumes of solvent must be utilized to obtain the desired block copolymer. Generally in the preparation of such polymers including block copolymers in anionic solution polymerization, only about 10 to 15 percent solids can be obtained conveniently. Belgium Pat. No. 883,346 sets forth a method in which the percent solids may be increased in a conventional anionic solution polymerization by the addition of that amount of a terminating agent just sufficient for the total deactivation of the reactive anionic chains and then followed by a second polymerization. In practice, however, the addition of the exact amount of a terminating agent is difficult to achieve. If the terminating agent is added in excess, then part of the initiator added for the second polymerization will be killed and the molecular weight of the polymer prepared in the second polymerization will be higher than the desired value. If not enough is added, then part of the reactive chains will remain reactive. Upon the addition of the monomer for the second polymerization, these still reactive chains will grow again and polymer of undesirable molecular weights and compositions will result.

It would be desirable if there were available an improved method for the preparation of random isopropenyl aromatic-vinyl aromatic copolymers with or without a diene block.

It would be desirable if there were available an improved method for the preparation of random isopropenyl aromatic-vinyl aromatic copolymers and block copolymers utilizing an anionically initiated solution polymerization which can provide polymer solutions of higher than about 20 weight percent solids.

It would be desirable if there were available an improved method for carrying out multiple polymerization in the same reaction mixture to raise the solids level without having to add at the end of each polymerization step an exact amount of a terminating agent for the total deactivation of the reactive anionic chains.

It would also be desirable if there were an improved solution polymerization process wherein the heat of polymerization were readily dissipated as the solids level is increased.

It would also be desirable if there were a solution polymerization process wherein an in situ polymer blend of random styrene α-methylstyrene copolymer and block polymers can be made.

These benefits and other advantages in accordance with the present invention are achieved in a process for the preparation of a polymer blend the steps of the method comprising (a) dissolving at least one monomeric member selected from the group consisting of vinyl aromatic monomers of the formula

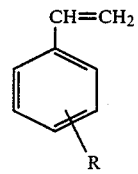

wherein R is hydrogen or a lower alkyl group containing up to four carbon atoms, and mixtures thereof with butadiene or isoprene in an isopropenyl aromatic monomer of the formula

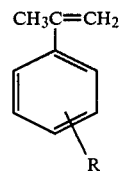

wherein R is a hydrogen or a lower alkyl group containing up to four carbon atoms to form at least a partially polymerizable solution initiating polymerization by adding an organo lithium polymerization initiator to thereby polymerize at least a major portion of vinyl aromatic monomer or mixtures thereof with butadiene or isoprene in the isopropenyl monomer to provide a first polymer solution of polymer dissolved in isopropenyl aromatic monomer, and terminating the polymerization;

(b) dissolving at least one monomer selected from the group consisting of vinyl aromatic monomer, and mixtures thereof with butadiene or isoprene in the first polymer solution, initiating polymerization thereof with an organolithium polymerization initiator to provide a second solution of polymer in isopropenyl aromatic monomer to thereby provide a desired polymer blend and terminating polymerization;

(c) optionally repeating addition(s) of monomer(s) from the Markush group of step (b) and polymerizing with an organo-lithium polymerization initiator to provide additional desired polymer blend(s).

Vinyl aromatic monomers suitable for the practice of the present invention have the formula:

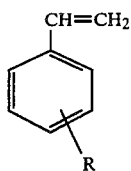

and R is selected from the group consisting of hydrogen, lower alkyl groups containing up to four carbon atoms, such as monomers, including styrene, para-methylstyrene, meta-ethylstyrene, para-tertiary-butylstyrene, and the like. Isopropenyl aromatic monomers for the practice of the present invention have the formula:

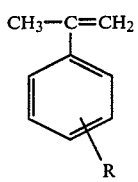

wherein R has the hereinbefore stated values such as α-methylstyrene, para-methyl-α-methylstyrene and the like. The isopropenyl aromatic monomer is used both as active monomer and solvent; however, it may contain 0–50 weight percent based on the weight of the isopropenyl aromatic monomer of an inert hydrocarbon solvent such as cyclohexane, hexane, heptane, benzene, toluene, and the like.

Block copolymers in accordance with the present invention may contain from about 5 to 98 weight percent diene and from 95 to 2 weight percent aromatic monomer and beneficially 40 to 90 weight percent diene. The resultant block copolymers may be elastomeric or resinous depending upon the proportions of the ingredients selected. Triblock polymers prepared employing low portions of the diene, i.e., 5 to 40 weight percent polybutadiene, are generally resinous, transparent, and particularly suited for packaging applications. Polymers in accordance with the present invention which contain higher proportions of the polydiene block, for example, from 50 to 98 weight percent polydiene, provide desirable thermoplastic elastomers or elastomers of improved green strength. Polymers containing from about 40 to 50 weight percent diene are what might be considered soft plastics. The molecular weight of the block copolymers in accordance with the present invention as determined by gel permeation chromatography will vary from about 5,000 to 800,000 molecular weight units. Particularly desirable polymers for most applications have a molecular weight range from about 20,000 to 500,000 molecular weight units. The term "random" as employed in the present invention is not used to mean that the two monomers in the copolymer are alternating in a one to one manner or conform strictly to random statistics. It is employed to mean that extensive block-like structures of polymerized vinyl aromatic monomer or a polymerized isopropenyl aromatic monomer do not exist.

Preferably the polymer block B is an elastomeric polymer block of an unsaturated diene such as butadiene, isoprene or mixtures thereof; and the polymer blocks A are plastic polymer blocks such as the random copolymers of α-methylstyrene and styrene, of α-methylstyrene and para-methylstyrene and the like. Block copolymers in accordance with the present invention may be of the linear AB or ABA configuration or the branched configuration such as $AB(BA)_n$. In the preparation of a linear polymer such as of the ABA configuration, a difunctional lithium initiator is employed; whereas in the preparation of the simplest branched or radial polymer having the structure $AB(BA)_n$ a polyfunctional or multifunctional lithium polymerization initiator is employed. Multifunctional lithium containing initiators are well known in the art as is the use of such initiators in the polymerization of olefinically unsaturated hydrocarbon monomers. Such polymers and initiators are disclosed in the following U.S. Pat. Nos. 3,660,536; 3,663,634; 3,668,263; 3,684,780; 3,725,368; 3,734,973; 3,776,893; 3,776,964; 3,784,637; 3,787,510; 3,954,894; 4,172,100; 4,172,190; 4,182,818; 4,196,153; 4,196,154; 4,200,718; 4,201,729 and 4,205,016, the teachings of which are herewith incorporated by reference thereto. It is known that very desirable lithium initiators can be prepared by the addition of two moles of an organo lithium compound, such as secondary-butyllithium, to one mole of a compound containing two 1,1-diphenylethylene groups. Where the process of the present invention is used to prepare random copolymer of the isopropenyl aromatic monomer and the vinyl aromatic monomer either as random copolymer or random copolymer-polydiene or graded diene polymer block in the presence of an organolithium polymerization initiator, the reaction is self-terminating. The self-terminating rate increases with increasing temperature. The mechanism of this termination is not well understood. Thus, it is unnecessary to add active hydrogen compounds to cause termination before proceeding with a subsequent polymerization step. However, a less than stoichiometric amount of terminator can be used to inactivate the polymer ends. Preferably, a terminator having only 60 to 90 percent of the theoretical amount required for termination is used. All or part of termination can occur by self termination.

The method of the present invention can be used in a variety of ways. The simplest embodiment can prepare a polymer of a desired molecular weight distribution. By sequential organolithium initiated polymerizations of like monomer charges, either narrow or broad molecular weight distribution is readily obtained by the use of the appropriate quantity of the organolithium initiator. By varying the monomer charge blends of any combinations of A, AB and $AB(BA)_n$ polymers are readily obtained without the necessity of conventional mechanical blending. For example in the preparation of AB block copolymer employing an initiator such as secondary-butyllithium or normal-butyllithium, several procedures may be used. A tapered AB block copolymer can be prepared by admixing the α-methylstyrene, butadiene and styrene monomer, adding initiator to provide a tapered AB polymer. Alternatively, α-methylstyrene and diene are admixed, monofunctional initiator added, the diene polymerized, subsequently the styrene monomer is added to the reaction mixture to provide a polymer with a polybutadiene block attached to a styrene-α-methylstyrene copolymer block. A similar block copolymer can be prepared by admixing the α-methylstyrene with styrene, monofunctional initiator and immediately after the styrene α-methylstyrene copolymerization is complete, the diene is added resulting in AB polymer with a polydiene block and an α-methylstyrene-styrene copolymer block. ABA polymers are readily prepared empolying the method of the present invention, employing a difunctional organolithium initiator by admixing, for example, α-methylstyrene, styrene and butadiene, adding difunctional initiator and on polymerization a tapered ABA α-methylstyrene-styrene diene polymer is obtained. Alternatively, the α-methylstyrene and butadiene are admixed, the initiator added, on completion of the polymerization of the butadiene, the styrene type monomer such as styrene is added to provide an ABA α-methylstyrene-styrene terminal block and a polybutadiene center block. Polymers of the ABA configuration are also prepared using monofunctional initiator such as secondary-butyllithium or a normal-butyllithium by admixing the α-methylstyrene and styrene monomers, adding initiator, on completion of copolymerization of the monomers the diene monomer is added, on completion of polymerization of the diene a coupling agent is introduced to the reaction mixture thereby providing a polymer of ABA configuration.

Another route to an ABA polymer is to admix the aromatic monomers with a monofunctional initiator, when copolymerization of the aromatic monomers is complete, the diene monomer is added, on completion of polymerization of the diene monomer additional vinyl aromatic monomer is provided to the reaction mixture resulting in an ABA polymer having a polydiene center block and aromatic copolymer terminal blocks. Alternatively, a vinyl aromatic monomer isopropenyl aromatic monomer mixture may be initiated and prior to completion of the copolymerization, diene monomer is added, also resulting in a polymer having ABA configuration.

So-called radial, star or multi-armed polymers desirably are prepared employing a polyfunctional initiator using the general procedure hereinbefore set forth wherein a tapered block copolymer may be obtained or a polydiene block obtained depending upon the sequence of monomer addition as hereinbefore set forth. An alternate route to radial block copolymers is to prepare a living polymer of the AB configuration and empolying a multifunctional coupling agent; for example, silicon tetrachloride, divinylbenzene and like, well known polyfunctional coupling agents.

By utilizing the process of the present invention, for example, styrene and initiator are intermittently added to the reaction mixture, permitted to copolymerize with the α-methylstyrene, such additions being made when polymerization had apparently stopped and become inactive. Advantageously the heat of polymerization is removed by any of the conventional means employed to remove the heat of polymerization; for example, by conduction, the use of a jacketed reactor, or by heat of vaporization of a solvent boiling at a desired polymerization temperature.

Polymerization in accordance with the present invention is generally carried out at a temperature between about 20° and 160° centigrade and most advantageously at a temperature between about 40° and 120° C. Because of the difference in reactivity between the vinyl aromatic monomer and the isopropenyl aromatic monomer, the isopropenyl aromatic monomer is generally present in a much greater concentration during polymerization than the proportion of the isopropenyl aromatic monomer in the polymer.

The present invention permits the solids content in the polymerization mixture to be raised to a high degree; and, from a practical standpoint, the solids level is limited only by the viscosity of the reaction mixture which can be readily processed in the equipment employed.

The present invention is illustrated but not limited by the following examples:

EXAMPLE 1

A 1-liter flask was charged with 168 grams of α-methylstyrene. 0.109 millimole of s-butyllithium in cyclohexane at room temperature was added to the α-methylstyrene to inactivate oxygen and other undesired impurities. The flask and contents were heated in a water bath that had a temperature which varied between 57° and 70° centigrade. The flask was heated for a period of about 15 minutes prior to the addition of 9.2 milliliters of styrene and 0.147 millimole of s-butyllithium in cyclohexane. The contents of the flask changed from colorless to orange red to red and to an orange yellow in a period of about 10 minutes. About 15 more minutes were allowed to assure the self-termination of the reactive chains. Then 8.8 milliliters of styrene monomer and 0.136 millimole of s-butyllithium in cyclohexane were added to a second polymerization.

Four additional charges of styrene monomer and s-butyllithium were made after each previous reactive chains self-terminated and are tabulated below.

| Addition No. | Styrene ml | s-BuLi m. mole | Time min.* | Between Additions |
|---|---|---|---|---|
| 3 | 8.3 | 0.131 | 40 | 2 and 3 |
| 4 | 7.9 | 0.125 | 15 | 3 and 4 |
| 5 | 7.5 | 0.120 | 25 | 4 and 5 |
| 6 | 7.2 | 0.115 | 25 | 5 and 6 |

*Time allowed for self-termination.

Twenty minutes after the 6th addition of styrene monomer and s-butyllithium, the polymer was terminated by the addition of 2 milliliters of isopropyl alcohol. Polymer solution weighing 1.823 grams was subjected to a vacuum at a temperature of 170° centigrade for 30 minutes. Polymer weighing 0.805 gram was recovered. From this determination the reaction mixture was calculated to have 44.2 weight percent polymer solids. The remainder of the reaction mixture was diluted with methanol to precipitate the polymer. Analysis by nuclear magnetic resonance indicated the polymer contained 51 weight percent α-methylstyrene and 49 weight percent styrene. The weight average molecular weight as determined by gel permeation chromatography was 143,000 and the ratio of weight average molecular weight to number average molecular weight was 1.43.

EXAMPLE 2

A tri-block copolymer was prepared in the following manner:

A difunctional lithium initiator was prepared by reacting 9.542 millimoles of s-butyllithium in 17.1 milliliters of cyclohexane with 4.776 millimoles of 1,3-di(1-phenylethenyl) benzene in 40 milliliters of toluene for a period of about 20 hours at room temperature. The resultant solution containing 0.0817 millimole of dilithium initiator per milliliter of solution.

A generally cylindrical jacketed reactor having a hollow auger agitator was charged with 1400 milliliters of α-methylstyrene which was treated with .0.67 millimole of s-butyllithium in cyclohexane at room temperature to inactivate oxygen and other active hydrogen impurities present. 54.2 Grams of 1,3-butadiene and 63.5 grams of styrene were added. The contents of the reactor were heated to about 55° centigrade. 26 Milliliters (2.12 millimole) of the difunctional lithium initiator solution were added. The external surface of the reactor was maintained at a temperature of about 55° centigrade. After a period of about 90 minutes the contents of the reactor changed from yellow to red and the temperature of the reaction mixture rose to about 70° centigrade. The external surface of the reactor was maintained at a temperature of about 55° centigrade for a period of about 110 minutes after the addition of the difunctional lithium initiator and the temperature subsequently raised to 75° centigrade for an additional 30 minutes to assure self-termination of the reactive chains. About 130 grams of the reaction mixture was withdrawn for analysis. The polymer recovered from this solution (13.8 weight percent solids) is herewith designated as Polymer A. The contents of the reactor were cooled to a temperature of about 25° centigrade and 46.4 grams of butadiene and 54.5 grams of styrene were added. The contents of the reactor were heated to about 55° centigrade. 21 milliliters of the difunctional lithium initiator solution were added. The 21 milliliters of initiator solution contained 1.72 millimoles of initiator. After 110 minutes, the temperature of the jacket was raised to 65° C. About 135 minutes after the second addition of styrene and butadiene, the temperature of the reaction mixture rose to about 77° centigrade. 165 minutes after the addition of styrene and butadiene, the reaction was terminated by the addition of 3 milliliters of isopropyl alcohol. The reaction mixture contained 24.8 weight percent solids. Polymer recovered from this solution is hereinafter referred to as Polymer B. Polymers A and B were recovered from the reaction mixture to which a small amount of Ionol (2,6-ditertiarybutyl-4-methylphenol) was added as a stabilizer by precipitation in methanol. Polymers A and B had a molecular weight of 114,000 and 106,000 respectively, as determined by gel permeation chromatography. Both Polymers A and B were analyzed by nulcear magnetic resonance and the weight compositions were:

| Polymer A: | α-Methylstyrene | 32.2% |
|---|---|---|
| | Styrene | 35.7% |
| | Butadiene | 32.1% |
| Polymer B: | α-Methylstyrene | 32.3% |
| | Styrene | 34.9% |
| | Butadiene | 32.8% |

The properties of Polymer B as determined from compression molded specimens are:

| Tensile yield strength | 3250 psi |
|---|---|
| Ultimate elongation | 45% |
| Tensile modulus | 1.63 × 10⁵ psi |
| Izod impact strength | 0.87 ft-lb/in notch |
| Vicat softening point | 116° C. |

EXAMPLE 3

A tapered styrene-α-methylstyrene isoprene styrene-α-methylstyrene triblock copolymer was prepared in the following manner. The procedure of Example 2 was repeated with the exception that isoprene was used in place of butadiene. The following quantities were employed in the initial polymerization step to prepare Polymer C:

| α-Methylstyrene | 1271 grams |
|---|---|
| Styrene | 76 grams |
| Isoprene | 49 grams |
| Dilithium initiator | 2.84 millimoles |

About 50 minutes at 70° Centigrade was allowed to assure self-termination.

In the second stage of polymerization to provide Polymer D, the following quantities of reactants were used:

| Polymer solution from C | 1274 grams |
|---|---|
| Styrene | 63.5 grams |
| Isoprene | 40.8 grams |
| Dilithium initiator | 2.03 millimoles |

On termination with 1 milliliter isopropyl alcohol, the reaction mixture was about 24.1 percent by weight solids.

The composition, molecular weights and properties of the resultant triblock copolymers are given below:

| | Composition (by weight) | |
|---|---|---|
| Polymer C: | α-Methylstyrene | 36.7% |
| | Styrene | 38.6% |
| | Isoprene | 24.7% |
| Polymer D: | α-Methylstyrene | 37.1% |
| | Styrene | 38.0% |
| | Isoprene | 24.9% |

The molecular weight as determined by gel permeation chromatography of Polymer C was 117,000; Polymer D was 95,000. The physical properties of Polymer D were:

| Tensile strength at break | 2230 psi |
|---|---|
| Ultimate elongation | 0.9% |
| Tensile modulus | 2.55 × 10⁵ psi |
| Izod impact strength | 0.37 ft-lb/in notched |
| Vicat softening point | 114° C. |

EXAMPLE 4

A tapered styrene-α-methylstyrene butadiene-isoprene styrene-α-methylstyrene triblock copolymer was prepared. The procedure of Example 2 was repeated with the exception that a one-to-one by weight mixture of butadiene and isoprene was employed in place of butadiene.

Polymer E was prepared employing the following ingredients:

| α-Methylstyrene | 1271 grams |
|---|---|
| Styrene | 76 grams |
| Isoprene | 31 grams |
| Butadiene | 31 grams |
| Dilithium initiator | 2.90 millimoles |

About 30 minutes at 70° Centigrade was allowed to assure the self-termination.

Polymer F utilized the following ingredients:

| | |
|---|---|
| Polymer solution from E | 1309 grams |
| Styrene | 63.5 grams |
| Isoprene | 25.9 grams |
| Butadiene | 25.8 grams |
| Dilithium initiator | 2.17 millimoles |

On termination with 1 milliliter isopropyl alcohol, the reaction mixture was 25.9 weight percent solids.

The triblock copolymers each had a molecular weight of 110,000 as determined by gel permeation chromatography. The composition in weight percent of Polymers E and F was 33.7 percent α-methylstyrene; 36.5 percent styrene; 14.9 percent isoprene and 14.9 percent butadiene. The physical properties of Polymer F were:

| | |
|---|---|
| Tensile yield strength | 3623 psi |
| Ultimate elongation | 27.2% |
| Tensile modulus | $1.48 \times 10^5$ psi |
| Izod impact strength | 0.52 ft-lb/in notched |
| Vicat softening point | 116° C. |

EXAMPLE 5

Tapered styrene-α-methylstyrene butadiene-isoprene styrene-α-methylstyrene triblock copolymer and a styrene-α-methylstyrene copolymer was prepared by repeated addition employing the procedure of Example 2 with the following exceptions: Polymer G is a triblock copolymer prepared from a one-to-one by weight mixture of butadiene and isoprene in place of butadiene. Polymer H is a mixture of Polymer G and a styrene-α-methylstyrene copolymer without diene in the second stage of polymerization.

The following reactants were employed:
For the preparation of Polymer G:

| | |
|---|---|
| α-Methylstyrene | 1271 grams |
| Styrene | 33.6 grams |
| Isoprene | 22.5 grams |
| Butadiene | 23.2 grams |
| Dilithium initiator | 2.20 millimoles |

About 40 minutes at 70° Centigrade was allowed to assure the self-termination.

And for Polymer H, the following reactants were employed:

| | |
|---|---|
| Polymer solution from G | 1256 grams |
| Styrene | 59 grams |
| s-Butyllithium | 1.19 millimoles |

Polymer G had a molecular weight of 106,000 as determined by gel permeation chromatography and a weight composition of 34.1 percent α-methylstyrene; 27.9 percent styrene; 18.7 percent isoprene and 19.3 percent butadiene.

Polymer H was determined to have a molecular weight of 97,000 by gel permeation chromatography and a weight composition of 42.4 percent α-methylstyrene; 39.1 percent styrene; 9.1 percent isoprene and 9.4 percent butadiene. The physical properties of Polymer H were determined on compression molding to be:

| | |
|---|---|
| Tensile yield strength | 5823 psi |

-continued

| | |
|---|---|
| Ultimate elongation | 3.6% |
| Tensile modulus | $3.34 \times 10^5$ psi |
| Izod impact strength | 0.48 ft-lb/in notched |
| Vicat softening point | 132° C. |

EXAMPLE 6

A tapered styrene-α-methylstyrene butadiene styrene-α-methylstyrene triblock copolymer was prepared in the following manner.

A 30 gallon reactor was charged with 61.10 kg α-methylstyrene which had been purified through an activated alumina bed. The α-methylstyrene was deoxygenated at 20° C. by applying vacuum and then filled with nitrogen. The remaining impurities were removed by adding 44 milliliters (63 millimoles) of 1.4318N sec-butyllithium solution. 1.65 kg uninhibited, oxygen-free styrene and 6.62 kg 1,3-butadiene were added. The butadiene was passed through a bed of DOWEX* MSC-1 K+ form ion exchange beads and a bed of activated alumina to remove any active impurities. An aliquot of 1.9 kg of the charge was withdrawn from the reactor. To 1.8 kg of this solution 10 milliliters of purified tetrahydrofuran was added and 0.1663N sec-butyllithium solution in cyclohexane was added until color appeared. Based on this titration the amount of impurities in the remaining feed which is now comprised of 59.43 kg α-methylstyrene, 6.44 kg butadiene and 1.61 kg styrene, was determined to be equivalent to 5 millimoles of difunctional lithium initiator. The content in the reactor was heated to 38° Centigrade and 5 millimoles of difunctional lithium initiator solution was added to inactivate the impurities. About 5 minutes later, 91 millimoles of the difunctional lithium initiator solution (0.0919 millimole per gram of solution) was added for initiation. The difunctional lithium initiator was prepared as described in Example 2. Within 2 hours, the temperature of the reaction mixture rose to about 87° Centigrade. After about 2.5 hours, a solution of 9.5 milliliters isopropyl alcohol in 20 milliliters toluene was added to terminate the polymer chains. About 1.2 kg of the reaction mixture was withdrawn for analysis. The polymer recovered from this solution (15.5 weight percent solids) is herewith designated as Polymer I. The contents of the reactor were cooled to 20° Centigrade and 6.05 kg of butadiene and 1.55 kg of styrene were added.

The contents of the reactor were heated to 47° Centigrade. 83 millimoles of the difunctional lithium initiator solution (0.0899 millimole per gram of solution) were added. Within 70 minutes the temperature of the reaction mixture rose to about 95° Centigrade. After 100 minutes, 30 milliliters of isopropyl alcohol was added. The reaction mixture contained 26.8 weight percent solids. Polymer recovered from this solution is hereinafter referred to as Polymer J. Polymers I and J were recovered from an aliquot (about 100 grams) of the reaction mixture to which a small amount of Ionol was added as stabilizer by precipitation in methanol. Polymers I and J had a molecular weight of 125,000 and 132,000 respectively, as determined by gel permeation chromatography. The composition in weight percent of both Polymers I and J was 23.9 percent α-methylstyrene; 15.0 percent styrene; and 61.1 percent butadiene as analyzed by nuclear magnetic resonance method. The properties of Polymers I and J as determined from compression molded specimens are:

| Polymer I: | Tensile rupture strength | 3090 psi |
| | Elongation at break | 730% |
| Polymer J: | Tensile rupture strength | 3240 psi |
| | Elongation at break | 780% |

EXAMPLE 7

A tapered styrene-α-methylstyrene butadiene styrene-α-methylstyrene triblock copolymer was prepared. The procedure of Example 6 was repeated with the exception that one more addition of monomers and initiator was made.

Polymer K was prepared employing the following ingredients:

| α-Methylstyrene | 58.28 kg |
| Styrene | 3.00 kg |
| Butadiene | 2.61 kg |
| Dilithium initiator | 128 millimoles |

After the reaction was completed, a solution of 12.9 milliliters isopropyl alcohol in 20 milliliters toluene was added to terminate the polymer chains. This solution contained 14.25 weight percent solids.

Polymer L was prepared by utilizing the following ingredients:

| Polymer solution from K | 64.33 kg |
| Styrene | 2.77 kg |
| Butadiene | 2.37 kg |
| Dilithium initiator | 121 millimoles |

After the reaction was completed, a solution of 12.6 milliliters isopropyl alcohol in 20 milliliters toluene was added to terminate the reactive chains. This solution contained 24.63 weight percent solids.

Polymer M was prepared by using the following ingredients:

| Polymer solution from L | 68.94 kg |
| Styrene | 2.33 kg |
| Butadiene | 1.99 kg |
| Dilithium initiator | 103 millimoles |

On termination with 43 milliliters acetic acid in 25 milliliters toluene, the reaction mixture contained 32.44 weight percent solids.

The composition (by weight) of the resultant triblock copolymers as analyzed by nuclear magnetic resonance method are given below:

| Polymer K: | α-methylstyrene | 33.9% |
| | Styrene | 34.3% |
| | Butadiene | 31.8% |
| Polymer L: | α-methylstyrene | 33.1% |
| | Styrene | 35.2% |
| | Butadiene | 31.7% |
| Polymer M: | α-methylstyrene | 33.4% |
| | Styrene | 35.4% |
| | Butadiene | 31.2% |

The molecular weight as determined by gel permeation chromatography of Polymer K was 100,000; Polymer L was 95,000; and Polymer M was 95,000.

EXAMPLE 8

A polymer blend consisting of two styrene-α-methylstyrene butadiene styrene-α-methylstyrene triblock copolymers with different compositions and styrene-α-methylstyrene random copolymers was prepared. The procedure of Example 6 was repeated with the exception that three more additions of styrene monomer and initiator were made.

The ingredients employed for making polymers N, O, P, Q, and R are given below:

| For making polymer N | |
| --- | --- |
| α-methylstyrene | 58.99 kg |
| Styrene | 1.78 kg |
| Butadiene | 1.52 kg |
| Dilithium initiator | 108 millimoles |

After the reaction was completed, the solution was kept at 62° Centigrade for 15 hours to assure the self-termination of the reactive chains. This solution contained 8.72 weight percent solids.

| For making polymer O | |
| --- | --- |
| Polymer solution from N | 63.12 kg |
| Styrene | 0.68 kg |
| Butadiene | 4.27 kg |
| Dilithium initiator | 86 millimoles |

After the reaction was completed, the solution was kept at 65° Centigrade for 13 hours to assure the self-termination of the reactive chains. This solution contained 18.46 weight percent solids.

| For making polymer P | |
| --- | --- |
| Polymer solution from O | 68.74 kg |
| Styrene | 2.81 kg |
| Sec-butyllithium | 40 millimoles |

On completion of the reaction, the solution was kept at 75° Centigrade for 40 minutes to assure the self-termination of the reactive chains. This solution contained 26.48 weight percent solids.

| For making polymer Q | |
| --- | --- |
| Polymer solution from P | 71.55 kg |
| Styrene | 2.30 kg |
| sec-butyllithium | 36 millimoles |

On completion of the reaction, the solution was kept at 75° Centigrade for 40 minutes to assure the self-termination of the reactive chains. This solution contained 32.48 weight percent solids.

| For making polymer R | |
| --- | --- |
| Polymer solution from Q | 73.85 kg |
| Styrene | 1.59 kg |
| sec-butyllithium | 37 millimoles |

After the reaction was completed 50 milliliters isopropyl alcohol was added. The solution contained 37.13 weight percent solids.

The composition of the resultant polymers N, O, P, Q and R as determined by nuclear magnetic resonance are given below:

| Polymer | Composition, weight percent | | |
|---|---|---|---|
| | Butadiene | Styrene | α-methylstyrene |
| N | 28.1 | 31.5 | 40.4 |
| O | 45.9 | 22.5 | 31.6 |
| P | 31.7 | 31.7 | 37.6 |
| Q | 25.1 | 33.8 | 41.1 |
| R | 21.5 | 35.1 | 43.4 |

The properties of polymer R as determined from injection molded specimens are:

| | |
|---|---|
| Tensile yield strength | 5300 psi |
| Ultimate elongation | 16% |
| Tensile modulus | $3.6 \times 10^5$ psi |
| Izod impact strength | 0.47 ft-lb/in notch |
| Vicat softening point | 122° C. |

In a manner similar to the foregoing examples, other polymers and copolymers using the hereinbefore monomers are readily prepared in accordance with the method of the invention at solids levels of at least 20 weight percent and greater based on the weight of reactants and solvent.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A process for the preparation of a polymer blend the steps of the process comprising
   (a) dissolving at least one monomeric member selected from the group consisting of vinyl aromatic monomers of the formula (I)

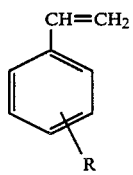

wherein R is hydrogen or a lower alkyl group containing up to four carbon atoms, and mixtures thereof with butadiene, or isoprene in an isopropenyl aromatic monomer of the formula

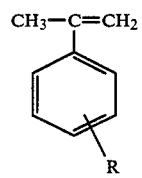

wherein R is hydrogen or a lower alkyl group containing up to four carbon atoms to form at least a partially polymerizable solution, adding an organolithium polymerization initiator and initiating polymerization to thereby polymerize at least a major portion of the monomeric member and at least some of the isopropenyl aromatic monomer to provide a first polymer solution and terminating polymerization;
   (b) dissolving an additional quantity of at least one monomeric member selected from the group consisting of vinyl aromatic monomers of formula (I) and mixtures thereof with butadiene or isoprene in the first polymer solution, adding an organolithium polymerization initiator and initiating polymerization to provide a second polymer solution and terminating polymerization;
   (c) optionally repeating step (b) one or more times; and
   (d) recovering the polymer blend.

2. The process of claim 1 wherein the polymer blend comprises random copolymers of a vinyl aromatic monomer and an isopropenyl aromatic monomer.

3. The process of claim 1 wherein the polymer blend comprises block copolymers having a diene component of from about 5 to 98 weight percent of the polymer.

4. The process of claim 3 wherein the polymer blend comprises a vinyl aromatic-isopropenyl aromatic random copolymer and a block copolymer wherein the diene component in the block copolymer is from about 5 to 40 weight percent of the block copolymer.

5. The process of claim 3 wherein the diene component of the copolymer is from about 40 to 98 weight percent of the block copolymer.

6. The method of claim 3 wherein a plurality of block polymers are present.

7. The method of claim 1 wherein the isopropenyl aromatic monomer is α-methylstyrene.

8. The method of claim 1 wherein the vinyl aromatic monomer is styrene.

9. The method of claim 1 wherein the vinyl aromatic monomer is para-methylstyrene.

10. The process of claim 1 wherein the polymer blend comprises a vinyl aromatic-isopropenyl aromatic random copolymer and a block copolymer wherein the diene component in the block copolymer is from about 40 to 95 weight percent of the block copolymer.

11. The process of claim 1 wherein the polymer blend contains a block copolymer which is a thermoplastic elastomer containing from about 50 to 90 percent by weight diene component.

12. The process of claim 1 wherein the polymer blend comprises thermoplastic elastomer.

13. The process of claim 1 wherein the solids level in the reaction mixture after polymerization is at least 20 percent by weight.

14. A process for the preparation of a polymer blend comprising:
    (a) adding a vinyl aromatic monomer corresponding to the formula (I)

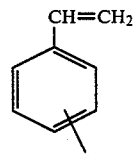

wherein R is hydrogen or a lower alkyl group containing up to four cabon atoms, or a mixture thereof with butadiene or isoprene to an isopropenyl aromatic monomer of the formula

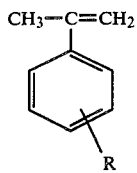

wherein R is as previously defined to form a partially polymerizable solution, adding an organolithium polymerization initiator and initiating polymerization to thereby polymerize at least a major portion of the vinyl aromatic monomer of formula (I) or mixtures thereof with butadiene or isoprene and a portion of the isopropenyl aromatic monomer to provide a first polymer mixture and terminating polymerization, (b) adding an additional quantity of at least one vinyl aromatic monomer according to formula (I) or a mixture thereof with butadiene or isoprene to the first polymer mixture, adding an organolithium polymerization initiator and initiating polymerization to provide a second polymer mixture, and terminating polymerization;

(c) optionally repeating step (b) one or more times; and (d) recovering the polymer blend.

15. A process according to claim 14, wherein in steps (a), (b) or (c) before proceeding with a subsequent polymerization step the polymerization is terminated by addition of a terminating agent in an amount from 60 to 90 percent of that theoretically required for termination.

* * * * *